US 8,090,893 B2

(12) United States Patent
Tamura et al.

(10) Patent No.: US 8,090,893 B2
(45) Date of Patent: *Jan. 3, 2012

(54) INPUT OUTPUT CONTROL APPARATUS WITH A PLURALITY OF PORTS AND SINGLE PROTOCOL PROCESSING CIRCUIT

(75) Inventors: Takashi Tamura, Hadano (JP); Toshiyuki Miyakoshi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,705

(22) Filed: May 20, 2010

(65) Prior Publication Data

US 2010/0228901 A1    Sep. 9, 2010

Related U.S. Application Data

(63) Continuation of application No. 10/915,453, filed on Aug. 11, 2004, now Pat. No. 7,752,375.

(30) Foreign Application Priority Data

Aug. 12, 2003    (JP) .................................. 2003-207248

(51) Int. Cl.
*G06F 13/36* (2006.01)
*G06F 3/00* (2006.01)
*G06F 5/00* (2006.01)
*G06F 13/14* (2006.01)

(52) U.S. Cl. ........................... 710/310; 710/52; 710/305

(58) Field of Classification Search .................... 710/52, 710/305, 310
See application file for complete search history.

(56) References Cited

U.S. PATENT DOCUMENTS

| 4,400,778 | A | * | 8/1983 | Vivian et al. | ...................... 710/1 |
| 5,218,688 | A | * | 6/1993 | Nishida | ......................... 711/151 |
| 5,689,644 | A | * | 11/1997 | Chou et al. | .................... 370/392 |

(Continued)

FOREIGN PATENT DOCUMENTS

EP    502436 A2    9/1992

(Continued)

OTHER PUBLICATIONS

"NN9605245: Object-Oriented Encapsulation of Input/Output Bus Protocols", May 1, 1996, IBM, IBM Technical Disclosure Bulletin, vol. 39, Iss. 5, pp. 245-248.*

(Continued)

*Primary Examiner* — Faisal M Zaman
(74) *Attorney, Agent, or Firm* — Brundidge & Stanger, P.C.

(57) ABSTRACT

The input output control device is provided with a plurality of fiber channel interface circuits and a protocol processing circuit capable of sequentially executing the protocol processing of each port, and is provided with a reception port identification register capable of identifying the port handling data to be received and a transmission port designation register designating the port handling data to be transmitted. In addition, it is possible to provide a controller using jointly the data buffers concerned with the plurality of ports. Control of a plurality of fiber channel interfaces with a low component count is possible, as is also the provision of an input output control device making an adequate capacity distribution with respect to the protocol processing between the plural fiber channel interfaces.

1 Claim, 4 Drawing Sheets

U.S. PATENT DOCUMENTS

| | | | |
|---|---|---|---|
| 5,784,649 A | | 7/1998 | Begur et al. |
| 5,878,278 A | * | 3/1999 | Carreiro et al. ............... 710/39 |
| 5,909,547 A | | 6/1999 | Mitra |
| 5,923,660 A | | 7/1999 | Shemla et al. |
| 5,924,112 A | | 7/1999 | Barber et al. |
| 6,005,849 A | | 12/1999 | Roach et al. |
| 6,085,278 A | | 7/2000 | Gates et al. |
| 6,098,110 A | | 8/2000 | Witkowski et al. |
| 6,185,623 B1 | * | 2/2001 | Bailey et al. ............... 709/238 |
| 6,212,165 B1 | | 4/2001 | Mann et al. |
| 6,240,096 B1 | | 5/2001 | Book |
| 6,442,179 B2 | | 8/2002 | Johnson |
| 6,591,302 B2 | * | 7/2003 | Boucher et al. ............. 709/230 |
| 6,594,275 B1 | | 7/2003 | Schneider |
| 6,622,217 B2 | * | 9/2003 | Gharachorloo et al. ...... 711/141 |
| 6,628,613 B1 | | 9/2003 | Joung et al. |
| 6,647,323 B1 | * | 11/2003 | Robinson et al. ................ 701/1 |
| 6,657,955 B1 | | 12/2003 | Bonneau et al. |
| 6,658,480 B2 | * | 12/2003 | Boucher et al. ............. 709/239 |
| 6,687,758 B2 | * | 2/2004 | Craft et al. .................... 709/250 |
| 6,742,063 B1 | | 5/2004 | Hellum et al. |
| 6,791,989 B1 | | 9/2004 | Steinmetz et al. |
| 6,807,179 B1 | | 10/2004 | Kanuri et al. |
| 6,807,581 B1 | * | 10/2004 | Starr et al. .................... 709/250 |
| 6,886,048 B2 | | 4/2005 | Richard et al. |
| 6,904,039 B1 | | 6/2005 | Hung et al. |
| 6,956,861 B2 | | 10/2005 | Reed et al. |
| 7,009,988 B2 | | 3/2006 | Han et al. |
| 7,035,289 B2 | | 4/2006 | Devine et al. |
| 7,139,240 B2 | | 11/2006 | Krezenstein et al. |
| 7,213,087 B1 | | 5/2007 | Bertone et al. |
| 7,239,642 B1 | * | 7/2007 | Chinn et al. ................... 370/401 |
| 7,320,017 B1 | | 1/2008 | Kurapati et al. |
| 7,327,748 B2 | | 2/2008 | Montalvo et al. |
| 7,370,147 B2 | * | 5/2008 | Nakamura et al. ........... 711/114 |
| 7,401,126 B2 | * | 7/2008 | Pekkala et al. ............... 709/217 |
| 7,752,375 B2 | * | 7/2010 | Tamura et al. ................ 710/310 |
| 7,831,653 B2 | * | 11/2010 | Nation et al. ................. 709/200 |
| 2002/0032825 A1 | * | 3/2002 | Saze et al. .................... 710/300 |
| 2002/0049608 A1 | * | 4/2002 | Hartsell et al. .................... 705/1 |
| 2002/0049841 A1 | * | 4/2002 | Johnson et al. .............. 709/225 |
| 2002/0064162 A1 | | 5/2002 | Lespagnol |
| 2002/0172195 A1 | | 11/2002 | Pekkala et al. |
| 2003/0110344 A1 | | 6/2003 | Szczepanek et al. |
| 2003/0198236 A1 | | 10/2003 | Denton et al. |
| 2004/0030745 A1 | | 2/2004 | Boucher et al. |
| 2004/0088574 A1 | | 5/2004 | Walter et al. |
| 2004/0098496 A1 | | 5/2004 | Wolrich et al. |
| 2004/0215848 A1 | | 10/2004 | Craddock et al. |
| 2005/0149651 A1 | | 7/2005 | Doak et al. |
| 2011/0131582 A1 | * | 6/2011 | Fritz et al. ..................... 718/104 |

FOREIGN PATENT DOCUMENTS

| | | | |
|---|---|---|---|
| EP | 778686 A2 | | 6/1997 |
| JP | 02094735 A | * | 4/1990 |
| JP | 03164957 A | * | 7/1991 |
| JP | 04286438 | | 10/1992 |
| JP | 05334223 | | 12/1993 |
| JP | 08130560 | | 5/1996 |
| JP | 08163129 A | * | 6/1996 |
| JP | 08237274 | | 9/1996 |
| JP | 09238140 A | * | 9/1997 |
| JP | 10105486 A | * | 4/1998 |
| JP | 10155010 A | * | 6/1998 |
| JP | 10340243 | | 12/1998 |
| JP | 2001325207 | | 11/2001 |
| JP | 2001523861 | | 11/2001 |
| JP | 2002500396 | | 1/2002 |
| WO | 9926151 | | 5/1999 |
| WO | 9934297 | | 7/1999 |
| WO | WO 2010133695 A1 | * | 11/2010 |

OTHER PUBLICATIONS

Henriksson, T.; Nordqvist, U.; Liu, D.; , "Specification of a configurable general-purpose protocol processor ," Circuits, Devices and Systems, IEE Proceedings—, vol. 149, No. 3, pp. 198-202, 2002.*

Uchida, T.; , "Hardware-based TCP processor for Gigabit Ethernet," Nuclear Science Symposium Conference Record, 2007. NSS '07. IEEE , vol. 1, pp. 309-315, Oct. 26, 2007-Nov. 3, 2007.*

Feldmeier, D.C.; , "A framework of architectural concepts for high-speed communication systems," Selected Areas in Communications, IEEE Journal on , vol. 11, No. 4, pp. 480-488, May 1993.*

Z. Meggyes, "Fibre Channel Overview", Aug. 15, 1994, Research Institute for Particle and Nuclear Physics, retrieved form the internet on May 2, 2006.

"Stack", Microsoft Computer Dictionary, Fifth Edition, Microsoft Corporation, 2002, p. 495.

IBM Technical Disclosure Bulletin, "Shared Buffer Control, NN82102488", Oct. 1982, IBM Corporation, vol. 25, Issue 5, pp. 2488-2489.

Kumaran et al, "Performance and fluid simulations of a novel shared buffer management system", Jan. 2001, ACM Trans. Model, Computer Simul., ACM. Vo. 11, Issue 1, pp. 43-75.

Sharma, et al "Optimal Buffer Management Policies for Shared-Buffer ATM Switches", Aug. 1999, IEEE/ACM Trans. Netw., IEEE Press, vol. 7, Issue 4, pp. 575-587.

Aiello et al, "Competitive Buffer Management for Shared-Memory Switches" Nov. 2008, ACM Trans. Algorithms, ACM, vol. 5, Issue 1, pp. 1-16.

* cited by examiner

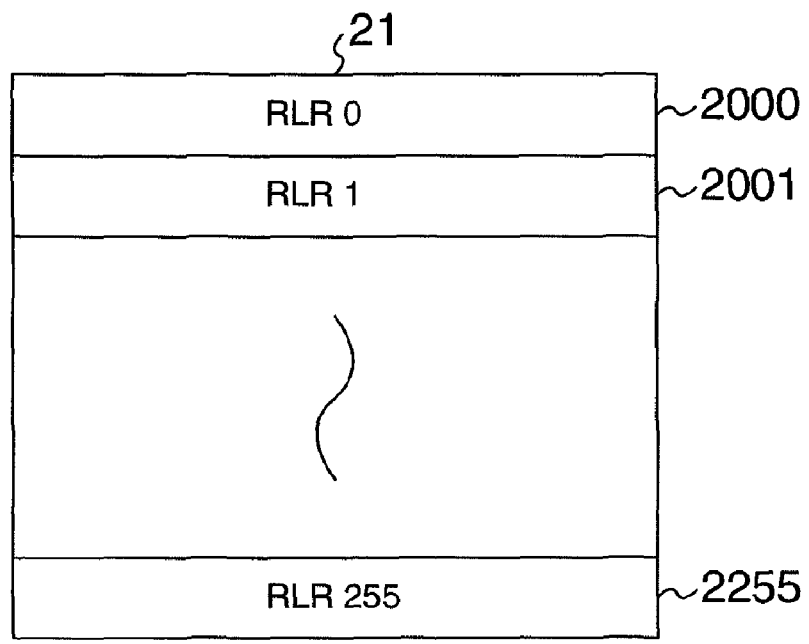

INPUT OUTPUT CONTROL APPARATUS WITH A PLURALITY OF PORTS AND SINGLE PROTOCOL PROCESSING CIRCUIT

The present application is a continuation of application Ser. No. 10/915,453, filed Aug. 11, 2004, now U.S. Pat. No. 7,752,375, the contents of which are incorporated herein by reference.

BACKGROUND OF THE INVENTION

The present invention relates to an input output control device for receiving and transmitting data within a computer network, and especially, to a device for receiving, generating, and transmitting frame data beyond the borders of the computer network.

In the field of very high speed data links, there is dramatic technological development. The data communications industry is setting its sight on high-performance computers. Performance-related requirements and improvements have given birth to uses employing data-intensive high-speed networks, such as multimedia, the visualization of scientific phenomena and expanded network designs. And then, it is desired to attain even higher speeds for the network interconnection between computers and input output devices as well.

Fibre Channel (FC) was developed in order to provide a practical and low-cost, yet extensible, means for transferring data swiftly between workstations, mainframes, supercomputers, desktop computers, storage devices, network servers, and other peripheral equipment. Fibre Channel is a general name for a collection of standards, consolidating standards prepared by the American National Standards Institute (ANSI), the related specifications for which are disclosed on the http://www.t11.org/ site et cetera. Also, in order to make possible even higher-speed data links, the 802.3ae specification, which implements a link speed of 10 Gbps, was established by The Institute of Electrical and Electronics Engineers (IEEE) in 2002, and using this as a base, the 10GFC specification is in the process of becoming standardized in the IEEE.

As a means of connecting this fibre channel with the host processor, the configuration using the Peripheral Component Interchange (PCI) standard established by the PCI-SIG (Special Interest Group) is widely used, and a Fibre Channel Host Bus Adapter (HBA) is offered in the market by each vendor. Also, it is common that these HBAs are equipped with a protocol processor for interpreting the Fibre Channel Protocol and controlling data transfers to and from the Main Storage (MS) device.

Now, the effective utilization of the host bus has been raised as a market demand in recent years. For example, as far as the aforementioned PCI host bus is concerned, it is demanded that the number of connections be determined per bus segment and that several fibre channels be connected on a single HBA in order to utilize the PCI bus effectively. Concerning the HBAs offered in the market, as a first method implementing a plurality of fibre channels on one adapter, a method has been adopted which provides input output control devices such as that described in the JP-A-1993-334223 official report, for two channels, with a single interface and a single protocol processor, and which also provides a PCI bridge in order to separate the system-side and HBA-internal bus segments.

In addition, there is also a second method consisting in integrating into a single LSI (Large Scale Integration) circuit a plurality of completely independent fibre channel control circuits, taking advantage of highly integrated LSI circuits made available by the progress of technology. If one has recourse to this method, it is sufficient just to integrate independent logic circuit cores into a single LSI circuit.

SUMMARY OF THE INVENTION

If demands from the market for even higher functionality are to be satisfied by applying prior art, the following problems are raised.

Problem 1

Concerning the market demand for an even higher number of ports, for example in order to implement a single adapter provided with four ports, if one has recourse to the first method practiced until now, one is obviously in a trend of increasing component counts. For this reason, the design difficulty due to the increase in wiring density of the adapter boards in question, and the cost of the boards, will soar, and there is also the apprehension that the probability of failure, considering in addition the adapter board as a whole, will get worse. Again, it may be thought that there will also be a harmful effect on data transfer performance, as the latency of requests via the PCI bridge is lengthened.

Problem 2

On the one hand, if one has recourse to the second method practiced until now, due to the logic circuit core with completely independent plural fibre channel functions, there occurs a waste of processing capacity in each core. Generally, input output processing is ordinarily not carried out to maintain peak performance, and there exist time periods with no processing performed and time periods demanding peak performance. For this reason, considered over a long time, the protocol processor is only processing approximately 50% of the time (much idle time). However, with a protocol processor performance at a 50% level of the peak performance, since a long time is required when input output processing requires peak performance, it is normally designed to satisfy peak time processing requirements. That having been said, even though on average a performance at a 50% level of peak times is sufficient, the protocol processor will maintain the performance for peak times occurring temporarily.

For example, let us consider the case of two completely independent logic cores, for two fibre channel functions integrated into one LSI circuit. The total processing capacity of these two protocol processors will be twice that of the peak capacity of one fibre channel function of the aforesaid configuration. In other words, because of their complete independence, it is not possible to perform a load distribution of the mutual processing on the mutual protocol processors, and they will on average have excess processing capacity.

Problem 3

As mentioned in the Background of the Invention, a higher-speed technology for a single fibre channel interface (10GFC) is in the process of becoming standardized, and if one considers a simple multiplication of the transfer rate in order to implement this, a protocol processor processing capacity five times higher or more than when using 2 Gbps becomes necessary. Neither with the first method nor the second method mentioned in the Background of the Invention is it possible to make an implementation only by simply equipping the device with multiple components, and it is necessary to introduce or develop processors et cetera capable of high-speed processing. Consequently, the ability to migrate from 2-Gbps to 10-Gbps processing is also a problem that should be considered.

It is an object of the invention of the present application to provide a high-flexibility input output control device which, in order to solve the problems mentioned above, supports a plurality of 2-Gbps fibre channels and which also takes into account the transition to 10-Gbps fibre channels.

The input output control device of the invention of the present application is provided with a plurality of fibre channel interfaces within a single device and a plurality of interface control circuits capable of independently controlling the above-mentioned interfaces.

In addition, in order to interpret and process the protocol executed on a plurality of fibre channel interfaces, the device is provided with a port identifying means, capable of identifying the interface ports covered by the protocol processing circuit, by exploiting frame reception et cetera, and a designating means, capable of designating interface ports on the contrary covered during frame transmission et cetera.

In addition, the device is provided with a single protocol processing circuit, performing the protocol processing concerning each port in the case of operation of 2-Gbps fibre channels having a plurality of ports, by using the above-mentioned port identifying means and the above-mentioned port designating means, and capable of ensuring the necessary capacity also in the case of operation of a 10-Gbps fibre channel.

BRIEF DESCRIPTION OF THE DRAWINGS

FIG. 2 is a schematic diagram of a reception data buffer used in an embodiment of the present invention.

FIG. 3 is a schematic diagram of a reception data stack used in an embodiment of the present invention.

DESCRIPTION OF EMBODIMENTS

Below, the circuits and the operation of one embodiment of the invention of the present application will be explained using the drawings.

Figure 7:
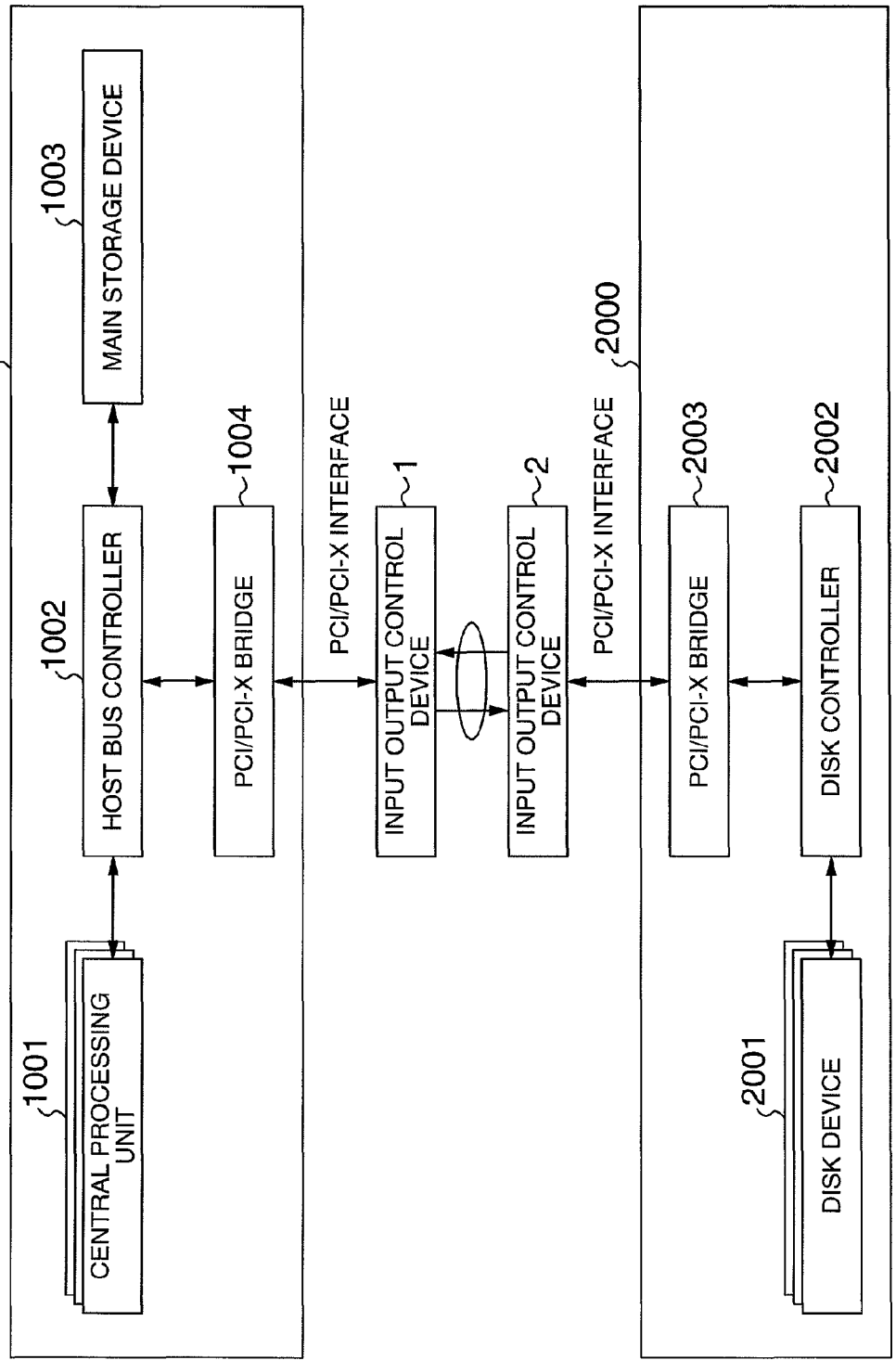
FIG. 7 is a schematic diagram of the whole of a system equipped with the input output control device implemented with the present invention.

FIG. 7 shows one example of a schematic diagram of the whole of a system provided with an input output control device implemented with the invention of the present invention. A host 1000 is composed of one or several central processing units 1001, a host bus controller 1002, a main storage device 1003, a PCI/PCI-X bridge 1004, and a disk control device 2000 is composed of disk devices 2001, a disk controller 2002, and a PCI/PCI-X bridge 2003. Input output control devices 1 and input output control devices 2 are connected respectively to host 1000 and disk control device 2000, and carry out data exchange through a fibre channel interface.

Figure 1:
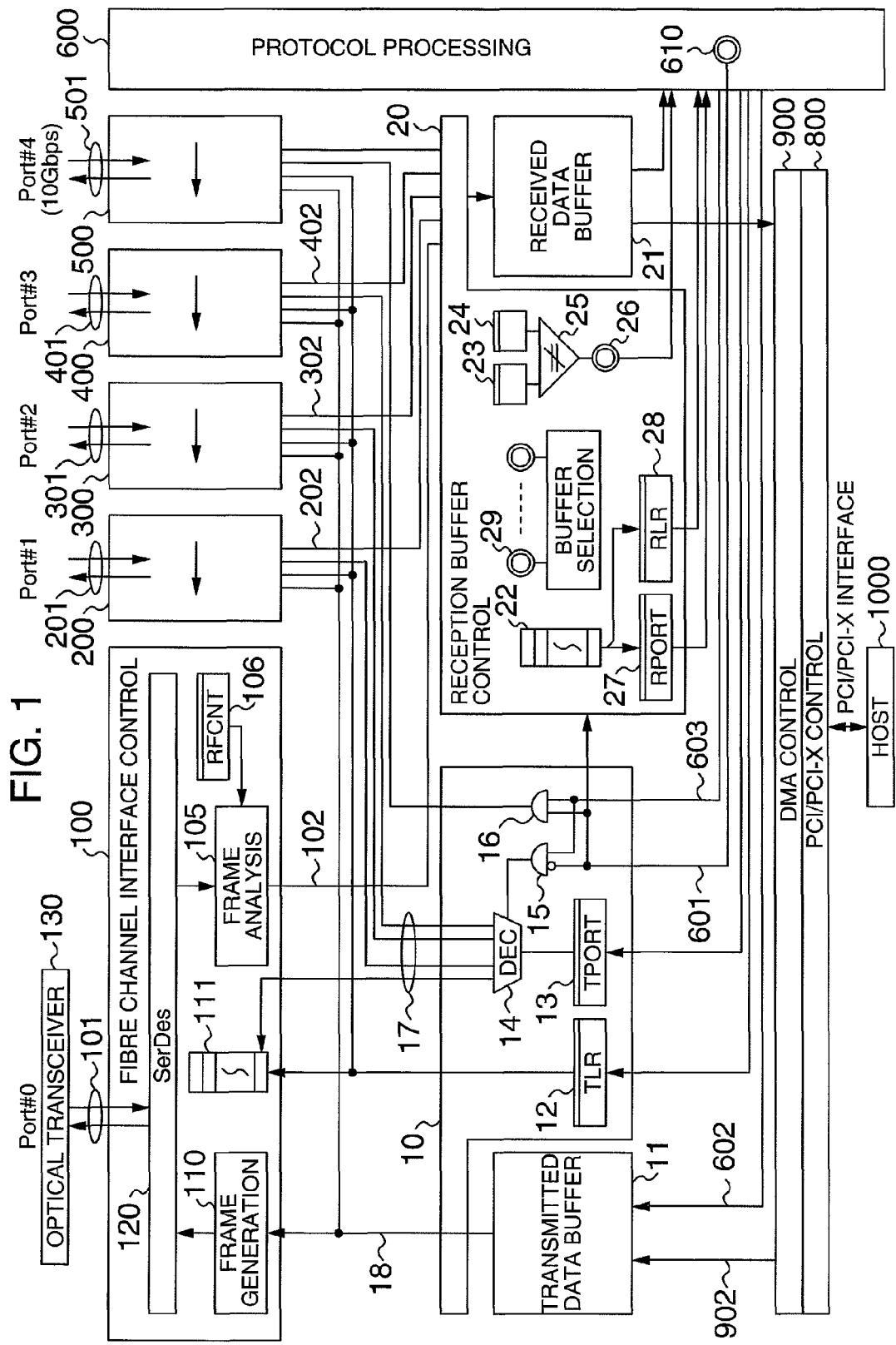
FIG. 1 is a schematic diagram of the input output control device applying an embodiment of the present invention.

FIG. 1 is an embodiment of an input output control device showing in the best way the characteristics of the invention of the present invention, the present input output control device being provided with low-speed fibre channel interfaces 101, 201, 301, 401 for four ports (in the present embodiment, 2 Gbps is assumed and will below be expressed as 2-Gbps fibre channel interfaces) as well as a high-speed fibre channel interface 501 for one port (in the present embodiment, 10 Gbps is assumed and will below be expressed as a 10-Gbps fibre channel interface). At this time, the 2-Gbps fibre channel interfaces and the 10-Gbps fibre channel interface can only be operated exclusively. Also, a PCI/PCI-X interface is adopted in order to carry out information exchange with host 1000 including central processing units 1001, main storage device 1003 and so forth.

With the other ends of the above-mentioned fibre channel interfaces connected through optical fibres to respective communication recipients, the four 2-Gbps fibre channel interfaces 101, 201, 301, 401 have fibre channel interface control circuits 100, 200, 300, 400, each operating independently and asynchronously, set up to be able to control the fibre channel interfaces. The 10-Gbps fibre channel interface 501 is connected to a fibre channel interface control circuit 500 and is set up to be able to support higher link speeds than 2 Gbps. In addition, the present input output control device can handle collectively the processing of a plurality of fibre channel interfaces by means of one protocol processing circuit 600.

First, the operation in case of data received from the fibre channel interface will be explained. Normally, an input output operation request originating in the operating system (OS), application, et cetera in operation in the central processing unit included in host 1000 is communicated to the input output control device via the PCI/PCI-X interface. For this communication, various means are provided and will not be mentioned here, but in the present embodiment, the input output operating request is communicated to protocol processing circuit 600.

Figure 4:
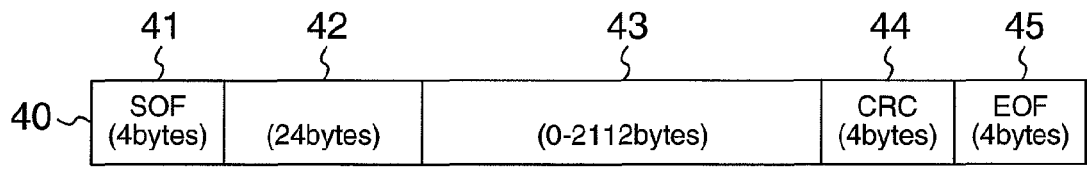
FIG. 4 is a drawing showing a frame format utilized in a fibre channel.

FIG. 4 represents a frame format 40 of the fibre channel being the object of recognition and assembly in the fibre channel interface control circuits 100, 200, 300, 400. The above-mentioned frame is composed of order sets SOF 41 and EOF 45 for the identification of frame breaks called delimiters, a header 42 including various pieces of information related to the concerned frame, a CRC (Cyclic Redundancy Check) portion 44 for error detection, and a payload 43, the validity of which is guaranteed by the CRC. The data being received in each fibre channel interface control circuit passes through an optical transceiver 130, via a serializer deserializer 120 (SerDes) converting the received serial data into parallel data, and goes through a frame analysis circuit 105 performing, from the parallel data, order set recognition, frame assembly, and error detection using the error-detection CRC et cetera, and is prepared to be written to a received data buffer 21. The fibre channel interface control circuits 100, 200, 300, 400 send the payload portions progressively while counting the frames and the recognized data lengths and, after having sent the last payload portion, sends the header portion and the counted payload length et cetera to received data lines 102, 202, 302, 402.

When a reception buffer control circuit 20 recognizes a write request on the received data lines 102, 202, 302, 402, it selects a vacant RLR number from received data buffer 21. At this time, in the case that several received data lines 102, 202, 302, 402 send requests simultaneously, it progressively processes sequentially the write requests by the method of deciding, by operating cycle, the port that should be served. This write capacity has a configuration which is able to adequately satisfy a 10-Gbps link speed and which, naturally, does not pose a problem even when 2 Gbps is operating simultaneously with four ports.

FIG. 2 is a schematic diagram of received data buffer 21. Received data buffer 21, responding to each frame, gets written to one location in the range from RLR0 (2000) to RLR255 (2255). The moment the writing from a certain port has been completed, reception buffer control circuit 20 writes (FIG. 3) the number identifying the concerned port and the number of the RLR in which the frame data received from the concerned port has been stored to a received data stack 22, and sets a "busy" bit 29, indicating the utilization status of the corresponding RLR, to busy status. Busy bit 29 is set to vacant status the moment the processing of the frame stored under the concerned RLR number has been completed by means of protocol processing circuit 600. A 10GFC flag line 601 from a 10GFC flag 610 controlled by protocol processing circuit 600 is connected to reception buffer control circuit 20, and when the concerned 10GFC flag line 601 is "1", a means inhibiting write requests from fibre channel interface control circuits 100, 200, 300, 400 is provided.

The received data stack 22, used in common by a plurality of ports, shown in FIG. 3, has a FIFO (First In First Out) configuration comprising an input pointer 23 and an output pointer 24, and in the initial state, the input pointer and the output pointer point to the same stack location. In the present embodiment, 256 stacks are possible. Updates of input pointer 23 are carried out by taking the opportunity of the above-mentioned frame reception completion. Due to this, an inequality detection circuit 25, checking the states of input pointer 23 and output pointer 24, goes into its initial state, and an interruption pending register 26 is set. At the same time as this, the contents of received data stack 22, indicated by output pointer 24, are read to a reception port identification register 27 (RPORT) and a reception buffer plane identification register 28 (RLR) and output pointer 24 is updated by one stack. At this time, while interruption pending register 26 is set, updates of reception port identification register 27 (RPORT), reception buffer plane identification register 28 (RLR) and output pointer 24 are inhibited, fulfilling the duty of preventing the above-mentioned registers and the output pointer from being updated erroneously.

When interruption pending register 26 is set, protocol processing circuit 600 recognizes that a new frame has been sent, by reading out reception port identification register 27 (RPORT) and reception buffer plane identification register 28 (RLR), and can identify from which of the several fibre channel interfaces the frame comes and under which RLR number of received data buffer 21 the concerned frame has been stored. Protocol processing circuit 600 is provided with a means for clearing interruption pending register 26, and clears interruption pending register 26 by using the above-mentioned clearing means after the contents of reception port identification register 27 (RPORT) and reception buffer plane identification register 28 have been saved and so forth in local storage (not shown in the figure). If several frames are held in received data stack 22, interruption pending register 26 is set for a second time. Protocol processing circuit 600 performs the processing, needed by the protocol, from the port number and RLR number acquired here, and if a data transfer to the host is needed, it can indicate the received data buffer internal address indicated by the RLR number, the main storage address, and the data transfer length to a Direct Memory Access (DMA) control circuit 900. The DMA control circuit 900, instructed to carry out the data transfer, specifies the data location of received data buffer 21 from the RLR number, and starts the data transfer with host 1000 through a PCI/PCI-X bridge 800. By providing an identifying means for the port number and the RLR number at the time of interrupt pending, it becomes possible to execute protocol processing spread over a plurality of ports, by means of the common protocol processing circuit 600, and in addition, because the frame reception reports arrive in the order of the frames, the service time period, for each port, becomes longer as the multiplicity of frames increases, and load balancing with respect to input output requests can evidently be attained.

Also, by making the plural received data buffers concerned with fibre channel interfaces a shared resource, a flexible buffer configuration can be provided. That is to say that registers 106 (RFCNT) defining the number of received data buffer planes that the concerned ports can respectively utilize are set up within the fibre channel interface control circuit, and, for each port, the number of received data buffer planes allowed is set in the above-mentioned RFCNT, within the range of the total number of buffer planes, at the time of initialization et cetera of the input output control device. Since 256 buffer planes are carried in the embodiment of the invention of the present application, one can for example set 128 planes to port 0, 64 planes to port 1, and 32 planes to ports 2 to 3 and so forth. Alternatively, if only ports 0 to 1 are operated, it is permitted to set 128 planes each to ports 0 to 1, or in the case only port 0 is used, to set 256 planes to port 0. Through the provision of the present means, it also becomes possible to provide the number of buffer credits, necessary for long-distance communication, without modifications to the hardware.

In the following, the operation of transmission of data to the fibre channel interface will be explained.

In a way similar to reception operation, protocol processing circuit 600, having recognized an input output operation request, must first, in order to perform transmission of data to the fibre channel interface, make a buffer reservation within a transmitted data buffer 11 and store the data to be transmitted to the concerned buffer. For the buffer reservation, it is permitted to perform busy state management within the protocol processing circuit, or to send off a buffer number setting and a busy state setting command for a transmission buffer plane designation register 12 (TLR) to a transmission buffer control circuit 10, but rather than stipulating one method or the other in the configuration of the invention of the present application, it is acceptable if a busy flag is provided. For data writing to transmitted data buffer 11, there is provided a first method in which protocol processing circuit 600 generates the data in question and writes it through processing circuit write line 602, and a second method in which DMA control circuit 900, due to a data transfer instruction by protocol processing circuit 600, writes it through DMA processing circuit write line 902. In the second method, a means is provided for DMA control circuit 900 to make a completion report (interrupts et cetera), when the data transfer instructed from protocol processing circuit 600 is completed.

Figure 5:
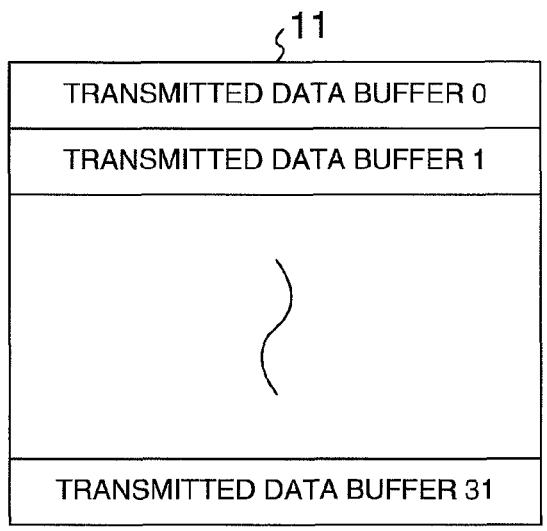
FIG. 5 is a schematic diagram of a transmission data buffer used in an embodiment of the present invention.

FIG. 5 is a schematic diagram of transmitted data buffer 11. Transmitted data buffer 11 is split by the number of buffer planes, and a capacity able to store payload portion 43 within frame format 40 of for example the fibre channel in FIG. 4 is reserved. Also, SOF 41, EOF 45 and header portion information item 42, within the frame format, have a storage means corresponding to the number of buffer planes of transmitted data buffer 11 provided separately, and provided together with a writing means for the above-mentioned storage means from protocol processing circuit 600.

When the preparation of the data to be transmitted is completed, protocol processing circuit 600 stores the buffer number of transmitted data buffer 11 into transmission buffer plane designation register 12 (TLR) and stores the port number, of the fibre channel interface transmitting the contents of the above-mentioned transmitted data buffer, into a transmission port designation register 13 (TPORT). A port address decoder 14 (DEC), in the latter part of transmission port designation register 13 (TPORT), is composed of decoding logic with enable, and when the decoding logic becomes enabled as a result of protocol processing circuit 600 having sent off a trigger signal to a transmission command line 603, the actual transmission instruction number is sent off to one out of the transmission command decoding lines 17. Consequently, by setting transmission port designation register 13 (TPORT), one protocol processing circuit 600 can bring into force transmission instructions for a plurality of fibre channel interfaces. In addition, 10GFC flag line 601, from 10GFC flag 610 controlled by protocol processing circuit 600, is connected to an AND gate 15 in the former part of the enable signal input of port address decoder 14, and when the above-mentioned 10GFC flag line 601 is "1", the transmission command decoding lines 17 to the four 2-Gbps fibre channel interface control circuits 100, 200, 300, 400 are usually nullified.

Figure 6:
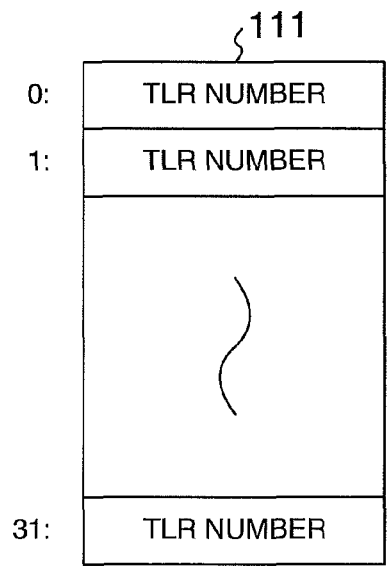
FIG. 6 is a schematic diagram of a transmission data stack used in an embodiment of the present invention.

In the above-mentioned processing, one of the fibre channel interface control circuits, being the recipient of the transmission command decoding line 17 to which the signal had been sent, stores the contents of transmission buffer plane designation register 12 (TLR) to a transmission data stack 111, in the form shown in FIG. 6. The above-mentioned transmission data stack 111 is configured FIFO, and with a sequential transmission request being generated in a way similar to that of reception buffer control circuit 20, the TLR number stored to transmission data buffer 111 is communicated to a frame generation circuit 110. Frame generation circuit 110 has a transmission data read line 18, for reading out data to be transmitted from transmitted data buffer 11, connected to it, also has a means provided for reading out SOF 41, EOF 45 and header information item 42, in addition generates CRC code 44, and, by assembling these, generates frame 40 in FIG. 4. The generated frame is converted by the serializer deserializer 120 (SerDes) from parallel data to bit serial data and is sent via optical transceiver 130 to the other end of the fibre channel interface.

As shown in FIG. 1, transmitted data read line 18 is shared by the four 2-Gbps fibre channel interface control circuits 100, 200, 300, 400, and when transmission commands instructed from protocol processing control circuit 600 are issued continuously, a data item bound for a different port comes in to transmitted data read line 18, in a time series, and gets sent off. In a way similar to that of the writing of received data to received data buffer 21, it has a configuration satisfying a link speed of 10 Gbps, and transmitted data buffer 11 is provided with a configuration not posing any problem, even when the 2-Gbps part simultaneously performs a readout to four ports.

The fibre channel interface control circuits 100, 200, 300, 400 release the concerned transmitted data buffer plane when frame transmission is completed. As the releasing means, it is acceptable to set the busy flag to "0" for each of the aforesaid transmitted data buffer planes. The released transmitted data buffer planes are reutilized for frame transmission performed by protocol processing control circuit 600 to an arbitrary port.

Above, an explanation of the operation and configuration of an embodiment of the invention of the present application was given, mainly for the case of 2-Gbps fibre channel interfaces operating simultaneously with four ports. As for the 10-Gbps fibre channel interface control circuit 500, in order to operate it at an even higher speed than when 2 Gbps is used, XGXS and other sublayer circuits stipulated in the 10 Gbps specification of the IEEE. However, the fundamental configuration is similar, and just by 10GFC flag 610, controlled by protocol processing circuit 600, getting set to "1", it is possible for protocol processing circuit 600 to allocate its entire processing capacity to a one-port 10-Gbps fibre channel without there being any conflict of access to the buffer generated during multi-port operation with 2 Gbps.

According to the present invention, there can be provided an input output control device equipped with fibre channel interfaces having a plurality of ports, having a low component count and no occupation of a physical host bus, and making possible a flexible distribution of protocol processing capacity. In addition, an input output control device accommodating high-speed fibre channel interfaces can also be provided. Additionally, there can also be provided an input output control device which can flexibly accommodate long-distance communication.

The above description has been given regarding an embodiment, but the present invention is not limited to this, and it should be obvious to a person skilled in the art that it is possible to make various modifications and amendments within the scope of the spirit and the appended claims of the present invention.

What is claimed is:

1. An input/output (I/O) control device, to which an I/O request originated in a host is communicated via a Peripheral Component Interconnect (PCI) interface, controlling a plurality of fibre channel interfaces for transmitting and receiving data corresponding to said I/O request in units of frames, said I/O control device comprising:
   a plurality of ports each having interface control circuits controlling said fibre channel interfaces independently with each of the other ports;
   a common received data buffer, being divided into a plurality of entries, storing frame data received by said plurality of ports, being directly connected with all of the interface control circuits through receive data lines;
   a common transmitted data buffer, being divided into a plurality of entries, storing frame data to be transmitted to said plurality of ports, being directly connected with all of the interface control circuits through a transmit data line;
   a single protocol processing circuit, to process collectively a plurality of protocols executed on said plurality of interfaces, carrying out processing of the frame data in said common transmitted data buffer and said common received data buffer;
   a transmission buffer entry number register for the setting, by said single protocol processing circuit, a buffer entry number of said common transmitted data buffer to which the frame data to be transmitted is stored;
   a transmission port number register for the setting, by said single protocol processing circuit, a port number of the port transmitting the frame data to be transmitted; and
   a decoding circuit generating, when said single protocol processing circuit has emitted a transmission instruction, a transmission instruction signal, from the contents of said transmission port number register, to the designated interface control circuit through one of a plurality of transmission command decoding lines, each transmission command decoding line being directly connected with each interface control circuit,
   wherein each interface control circuit comprises:
   a transmission stack reading out and storing the contents of said transmission buffer entry number register, after said interface control circuit has received said transmission instruction signal, and
   a frame generation circuit sequentially reading out the transmission buffer entry number information stored in said transmission stack, reading out the corresponding transmission data from said common transmitted data buffer through said transmit data line, and generating transmission frames.

\* \* \* \* \*